United States Patent
Sitaram et al.

(10) Patent No.: US 11,483,809 B1
(45) Date of Patent: Oct. 25, 2022

(54) VARIABLE SCANNING TIMERS IN A MULTI BAND/MULTI-OPERATOR NETWORK

(71) Applicant: Sprint Spectrum LP, Overland Park, KS (US)

(72) Inventors: Krishna Sitaram, Chantilly, VA (US); Daniel Vivanco, Sterling, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 2491 days.

(21) Appl. No.: 14/015,101

(22) Filed: Aug. 30, 2013

(51) Int. Cl.
*H04W 36/00* (2009.01)
*H04W 72/04* (2009.01)

(52) U.S. Cl.
CPC ................. *H04W 72/042* (2013.01)

(58) Field of Classification Search
CPC ............ H04W 72/0453; H04W 88/06
See application file for complete search history.

(56) References Cited

U.S. PATENT DOCUMENTS

| | | | |
|---|---|---|---|
| 7,792,554 B2 | 9/2010 | Abdel-Kader | |
| 7,925,260 B2 * | 4/2011 | Benveniste | H04W 16/14 455/434 |
| 8,107,954 B2 | 1/2012 | Islam et al. | |
| 8,226,340 B1 * | 7/2012 | Mahalingam | H04W 12/08 411/411 |
| 8,244,246 B2 | 8/2012 | Gandhi et al. | |
| 8,271,685 B1 | 9/2012 | Reeves et al. | |
| 9,439,195 B1 * | 9/2016 | Vivanco | H04B 7/15 |
| 2012/0322481 A1 * | 12/2012 | Laroche et al. | 455/509 |
| 2013/0272219 A1 * | 10/2013 | Singh et al. | 370/329 |

FOREIGN PATENT DOCUMENTS

KR 1843617 A2 * 10/2007

* cited by examiner

*Primary Examiner* — Khalid W Shaheed

(57) ABSTRACT

Systems and methods for operating a wireless communication system are provided. A network node can determine a first frequency band criteria and a second frequency band criteria based on information from an access node. The network node can determine a first timer duration of a first timer. The first timer duration can be based on the first frequency band criteria. The network node can determine a second timer duration of a second timer. The second timer can be based on the second frequency band criteria. The first timer duration can be different from the second timer duration. The access node can transmit the first timer duration and the second timer duration to the wireless device after the wireless device establishes communication with the access node.

16 Claims, 7 Drawing Sheets

VARIABLE SCANNING TIMERS IN A MULTI BAND/MULTI-OPERATOR NETWORK

TECHNICAL BACKGROUND

Wireless network operators can provide access to wireless devices to allow communications over a wireless communication network. Wireless devices can select to establish communications with an access node of the network from a plurality of different frequency bands. The different frequency bands can include frequency bands within the same radio access technology, frequency bands within differing radio access technologies, frequency bands provided by the same network provider, and/or frequency bands provided by different network providers.

While a wireless device has the ability to communicate over various frequency bands, generally a wireless device can only establish communications over the network with one frequency band at a time. When the wireless device connects to the network over a less-preferred frequency band, a wireless device can scan for a more preferred frequency band. Typically, a wireless device initiates a single timer and scan for all available frequency bands during a single scan duration.

A timer duration (e.g. time between scans) and/or a scanning duration (e.g. the total time the wireless device scans for more preferred frequency bands) can undesirably affect a user experience. For example, when the timer duration is too short, the wireless device can use a significant amount of time and battery power by frequently scanning for other frequency bands. When the timer duration is too long, the wireless device can establish a communication session over a less preferred frequency band for extended periods, which can potentially result in a dropped call. When the scanning duration is too short, preferred frequency bands can be overlooked when the list of available frequency bands is longer than the scan duration allows. When the scanning duration is too long, the wireless device can be delayed in receiving a paging messages over the current frequency band because the wireless device cannot scan for other frequency bands while monitoring a paging channel for pages sent form the network.

Overview

Systems and methods for operating a wireless communication system are provided. A network node can determine a first frequency band criteria and a second frequency band criteria based on information from an access node. The network node can determine a first timer duration of a first timer. The first timer duration can be based on the first frequency band criteria. The network node can determine a second timer duration of a second timer. The second timer can be based on the second frequency band criteria. The first timer duration can be different from the second timer duration. The access node can transmit the first timer duration and the second timer duration to the wireless device after the wireless device establishes communication with the access node.

Another system and method for operation a wireless communication system can be provided. A network node can receive a first frequency band criteria of a first frequency band based on information from a first access node. The network node can receive a second frequency band criteria of the first frequency band based on information from a second access node. The network node can receive a third frequency band criteria of a second frequency band based on information from the first access node. The network node can receive a fourth frequency band criteria of the second frequency band based on information from the second access node. The network node can determine a first timer duration of a first timer based on the first frequency band criteria and the second frequency band criteria. The network node can determine a second timer duration of a second timer based on the third frequency band criteria and the fourth frequency band criteria. The first timer duration can be different from the second timer duration. The network node can transmit the first timer duration and the second timer duration to the wireless device after the wireless device establishes communications with the first access node.

DETAILED DESCRIPTION

Figure 1:
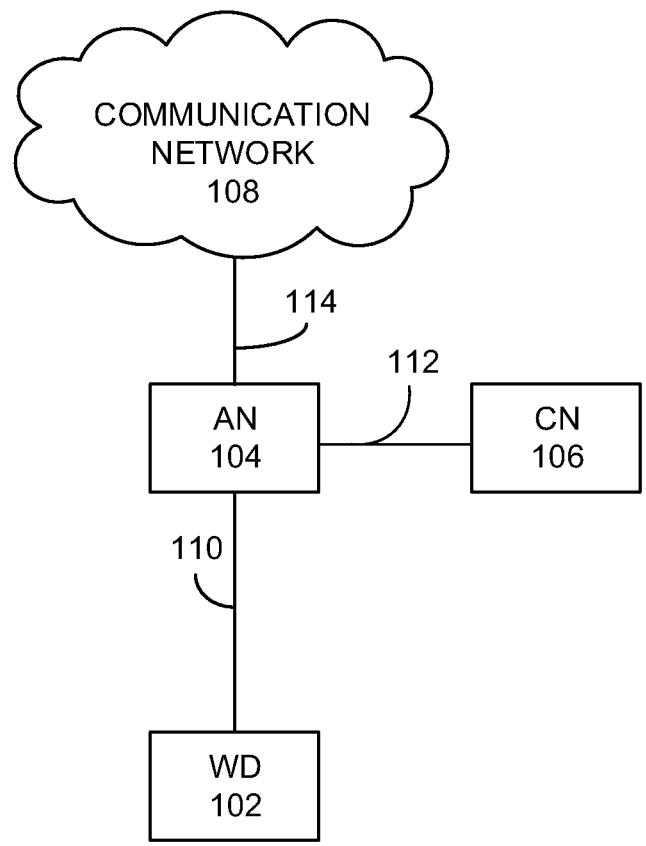
FIG. 1 illustrates an exemplary communication system.

FIG. 1 illustrates an exemplary communication system 100 for providing wireless communications to a wireless device. Communication system 100 can comprise wireless device 102, access node 104, network node 106, and communication network 108. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication between, for example access node 104 and communication network 108, which are omitted for clarity, including additional processing nodes, routers, gateways, and physical and/or wireless data links for carrying data among the various network elements.

Wireless device 102 can be any device configured to communicate over communication system 100 using a wireless interface. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented according to various exemplary embodiments disclosed herein.

The wireless interface of wireless device 102 can include a plurality of transceivers, where each transceiver is associated with a different frequency band. Different frequency bands can be associated with the same or different radio access technologies. For example, wireless device 102 can include at least one transceiver associated with at least one frequency band of at least one wireless cellular protocol such as code division multiple access (CDMA), global system for mobile communications (GSM), worldwide interoperability for microwave access (WiMAX), long-term evolution (LTE), and/or high-speed downlink packet access (HSDPA), etc.

Wireless device 102 can be in communication with access node 104 through communication link 110. Link 110 can use various communication media, such as air, space, metal, optical fiber, or some other signal propagation path—including combinations thereof. Communication link 110 may comprise many different signals sharing the same link. Communication link 110 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 102 and access node 104 could share the same representative wireless link 110, but be transferred over different communication sessions, frequencies, timeslots, packets, ports, sockets, logical transport links, or in different directions—including combinations thereof.

Wireless device 102 can establish a communication session with controller node 106 via access node 104 to communicate information over system 100 using various communication services. These services can include voice and/or data services. For example, mobile voice services, mobile data services, push-to-talk services, internet services, web browsing, email, pictures, picture messaging, video, video messaging, audio, voicemail, music, MP3's, ring tones, stock tickers, new alerts, etc.

Access node 104 can be any network node configured to provide communications to wireless device 102. For example, access node 104 can be selected from a base transceiver station, a radio base station, an eNodeB device, or an enhanced eNodeB device. It is noted that while only one access node 104 is illustrated in FIG. 1, any number of access nodes can be implemented within system 100.

Access node 104 can be configured to establish communication sessions with wireless device 102 over a plurality of frequency bands and/or using a plurality of radio access technologies. For example, access node 104 can be configured to provide at least one frequency band within a 3G mode and at least one frequency band within a 4G mode. In addition, access node 104 can be configured to provide a plurality of frequency bands within each radio access technology. For example, access node 104 can be configured to establish communication sessions with wireless device over a first, second, third etc. frequency band within the 3G and/or 4G modes.

Access node 104 can comprise a processor and associated circuitry to execute or direct the execution of computer-readable instructions to obtain information. Access node 104 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 104 can receive instructions and other input at a user interface.

Controller node 106 can be any network node configured to communicate information or control information over system 100. Controller node 106 can be a standalone computing device, computing system, or network component, and can be accessible, for example, by a wired or wireless connection, or through an indirect connection such as through a computer network or communication network. For example, controller node 106 can include a mobility management entity (MME), a serving gateway (SGW), a public data network gateway (PGW), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 106 is not limited to any specific technology architecture, such as Long Term Evolution (LTE) and can be used with any network architecture and/or protocol.

Controller node 106 can comprise a processor and associated circuitry to execute or direct the execution of computer-readable instructions to obtain information. Controller node 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 106 can receive instructions and other input at a user interface.

Controller node 106 can be in communication with access node 104 through communication links 112. Access node 104 can be in communication with communication network 108 through communication link 114. Communication links 112, 114 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 112, 114 can be a direct link or might include various equipment, intermediate components, systems, and networks.

Communication network 108 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 108 can be capable of carrying data, for example, to support voice, push-to-talk, and data communications by a wireless device such as wireless device 102. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

In operation, wireless device 102 can be configured to communicate with access node 104 using various frequency bands associated with one or more radio access technologies where one frequency band of one radio access technology is most-preferred. For example, wireless device 102 can be configured to communicate in both a 3G mode and a 4G mode, where 4G is the most-preferred mode.

Access node 104 can be configured to communicate with wireless device 102 over a plurality of frequency bands where at least one frequency band is associated with the 3G mode and one frequency band is associated with the 4G mode. In addition, the frequency bands can be associated with a home network operator and/or roaming network operators.

Controller node 106 can determine a timer having a timer duration for each frequency band associated with the access node 104 based on information from the access node 106. For example, controller node 106 can determine a timer, such as a better system reselection (BSR) scanning timer, for each frequency band associated with the access node 104 where any number more than one frequency band can be associated with the access node 104.

Each timer can be based on at least one criteria associated with each frequency band. For example, the frequency band criteria can be based on at least one of a coverage criteria of the frequency band associated with access node 104, capacity of the access node corresponding to the frequency band, and/or information indicative of costs associated with establishing a communication session between the wireless device 102 and the access node 104 over the frequency band. The coverage criteria can further include information indicative of a coverage area of the access node 104 within the frequency band, a signal level within the coverage area of the access node within the frequency band, and/or a throughput associated with the frequency band within the coverage area.

The controller node 106 can initiate an inquiry to access node 104 to request the frequency band criteria. This inquiry can be initiated at predetermined intervals or in response to a predetermined event. Alternatively, the controller node 106 can instruct the access node 104 to send the frequency band criteria at predetermined intervals or in response to a predetermined event such as when a frequency band criteria exceeds a predetermined threshold or when a wireless device initiates a communication session or discontinues a communication session with the access node.

Controller node 106 can determine the timer duration for each timer associated with each frequency band based on the frequency band criteria received from access node 104. For example, controller node 106 can receive a first frequency band criteria of a first frequency band from access node 104 and a second frequency band criteria of a second frequency band from access node 104. Each timer duration can be different from other timer durations. For example, the timer duration of a most preferred frequency band can be less than a timer duration for a lesser preferred frequency band such that when the timer is initiated at the wireless device 102, the wireless device 102 scans for the most preferred frequency band more often than scanning for a lesser preferred frequency band.

The controller node 106 can then transmit each timer duration to the wireless device 102 after the wireless device establishes a communication session with the access node 104. For example, when the wireless device establishes a communication session with the access node over a lesser-preferred frequency band, the controller node 106 can send instructions to the wireless device 102 to initiate scanning of more-preferred frequency bands. Controller node 106 can instruct wireless device 102 to initiate each timer during an idle mode where the timers can be initiated substantially simultaneously such that the timer durations can overlap.

Figure 2:
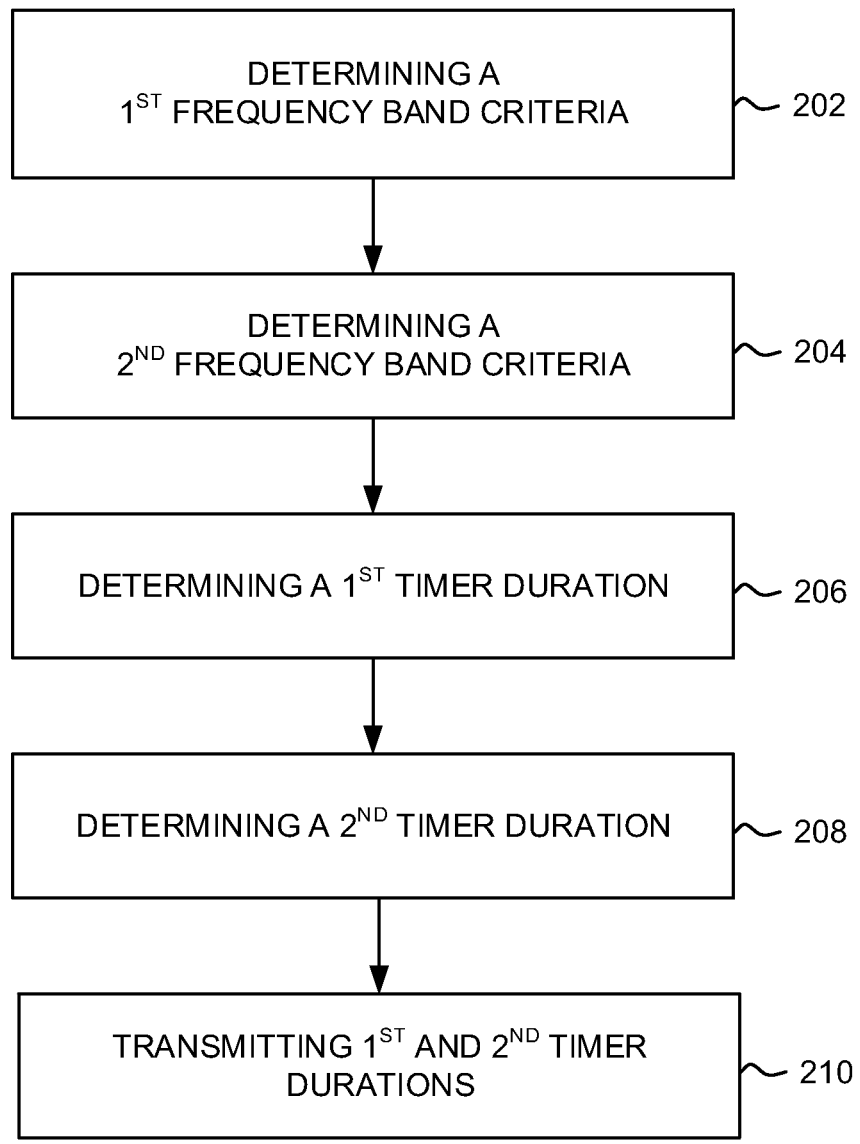
FIG. 2 illustrates an exemplary method of communicating with a wireless device in a wireless communication system.

FIG. 2 illustrates a flow chart of an exemplary method of communicating with a wireless device in a wireless communication system. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

A network node can determine a first frequency band criteria at 202 and a second frequency band criteria at 204. For example, controller node 106 can determine a first frequency band criteria and a second frequency band criteria associated with access node 104. The first frequency band criteria and the second frequency band criteria can be selected from at least one of a coverage criteria of each frequency band associated with access node 104, capacity of the access node corresponding to each frequency band, and/or information indicative of costs associated with establishing a communication session between the wireless device 102 and the access node 104 over each frequency band. The coverage criteria can further include information indicative of a coverage area of the access node 104 within each frequency band, a signal level within the coverage area of the access node within each frequency band, and/or a throughput associated with each frequency band within the coverage area.

A network node can determine a first timer duration at 206 and a second timer duration at 208. For example, controller node 106 can determine a first timer duration associated with a first frequency band based on the first frequency band criteria and a second timer duration associated with a second frequency band based on the second frequency band criteria. The timer durations can be associated with more or less preferred frequency bands. For example, a timer duration associated with a more-preferred frequency band can be shorter than a timer duration associated with a lesser-preferred frequency band.

At 210, a network node can transmit the first timer duration and the second timer duration to a wireless device. For example, controller node 106 can transmit instructions including the first timer duration and the second timer duration to wireless device 102 after wireless device 102 establishes a communication session with access node 104 over a lesser-preferred frequency band. Wireless device 102 can use a first timer having the first timer duration and a second timer having the second timer duration to scan for a more preferred frequency band.

The first timer and the second timer can be initiated at the wireless device 102 during an idle mode and when each timer duration expires, the wireless device can initiate a scan for the corresponding frequency band. For example, wireless device 102 can initiate a scan for the first frequency band after the first timer duration expires and the wireless device 102 can initiate a second for the second frequency band after the second timer duration expires.

While not illustrated in FIG. 2, one of ordinary skill in the art would recognize that the network node can determine any number of timer durations based on the number of frequency bands associated with access node 104. For example, when access node 104 can establish a wireless communication session with wireless device 102 using three different frequency bands where the frequency bands can be associated with the same or different network operators, controller node 106 can determine three different timer durations.

Figure 3:
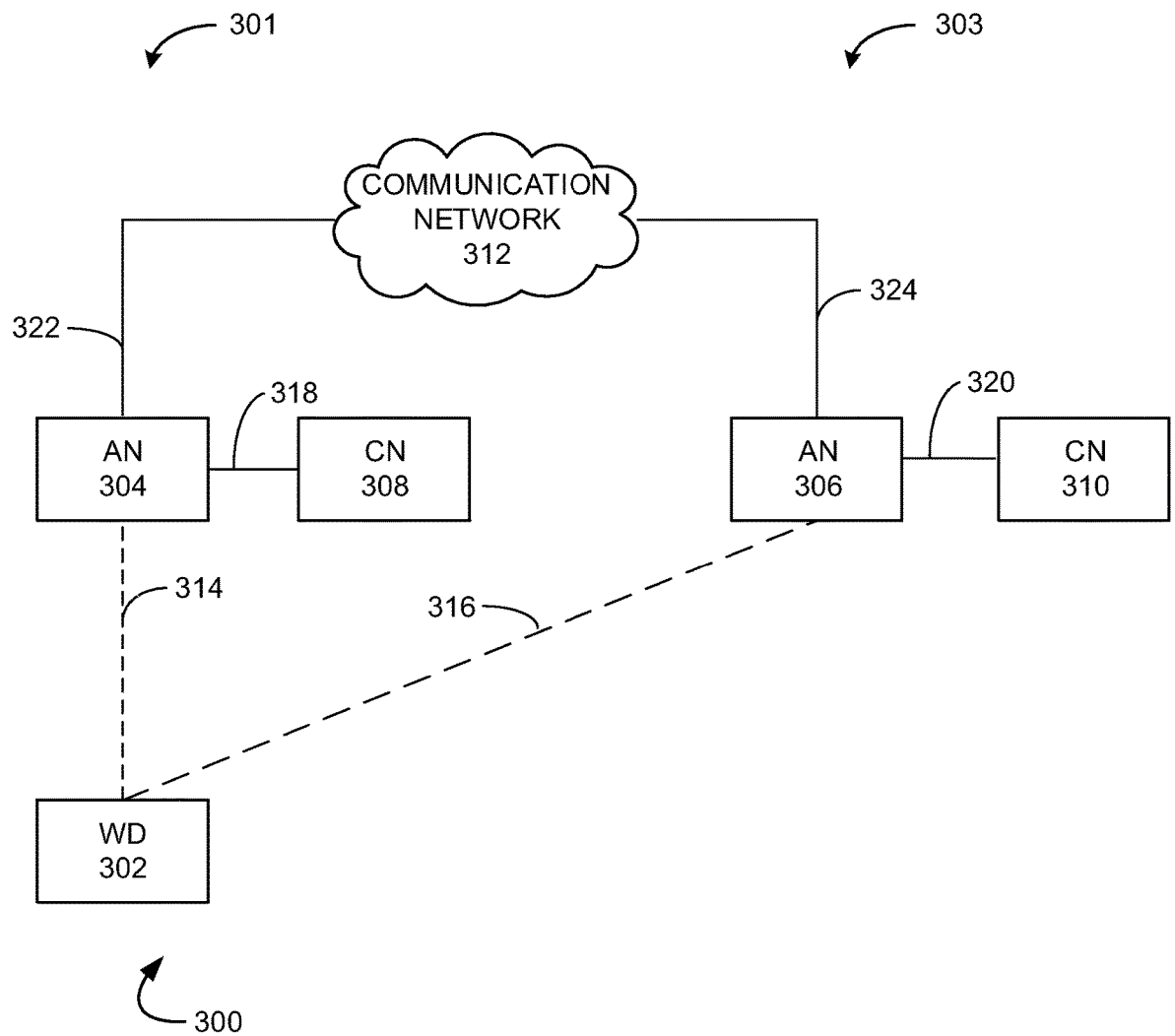
FIG. 3 illustrates another exemplary communication system.

FIG. 3 illustrates an exemplary communication system 300 for providing wireless communications to a wireless device. Communication system 300 can comprise a wireless device 302, an access node 304 and a controller node 308 associated with a first network operator 301, an access node 306 and a controller node 310 associated with a second network operator 303, and a communication network 312. Other network elements may be present in the communication system 300 to facilitate communication but are omitted for clarity, such as base stations, base station controllers, gateways, mobile switching centers, dispatch application processors, and location registers such as a home location register or visitor location register. Furthermore, other network elements may be present to facilitate communication, for example between wireless device 302 and communication network 312, which are omitted for clarity, including additional processing nodes, routers, gateways, and physical and/or wireless data links for carrying data among the various network elements.

A network operator can be a communications provider that provides access to a network where communications are transmitted over the network. Typically, a network operator owns and operates the nodes within the network. However, a primary network operator (e.g. home network operator) can enter into relationships with other network operators (e.g. roaming network operators) to share resources such as frequency bands, network environments, etc. For example, multiple network providers may operate in a multi-operator core network environment, and can enter into agreements to share frequency bands or other network resources. Frequency band sharing and/or roaming agreements may be limited in scope, and network providers can share resources of the network while not sharing other resources of the network. For example, one network provider can share one frequency band with a second network provider while not sharing resources of another frequency band.

Wireless device 302 can be any device configured to communicate over communication system 300 using a wireless interface. For example, wireless device 302 can include a cell phone, a smart phone, a computing platform such as a laptop, palmtop, or a tablet, a personal digital assistant, or an internet access device, and combinations thereof. It is noted that while one wireless device is illustrated in FIG. 3 as being in communication with access node 304, any number of wireless devices can be implemented according to various exemplary embodiments disclosed herein.

The wireless interface of wireless device 302 can include a plurality of transceivers, where each transceiver is associated with a different frequency band. Different frequency bands can be associated with the same or different radio access technologies. For example, wireless device 302 can include at least one transceiver associated with at least one frequency band of at least one wireless cellular protocol such as code division multiple access (CDMA), global system for mobile communications (GSM), worldwide interoperability for microwave access (WiMAX), long-term evolution (LTE), and/or high-speed downlink packet access (HSDPA), etc.

Wireless device 302 can be in communication with access node 304 through communication link 314 or in communication with access node 306 through communication link 316. Links 314, 316 can use various communication media, such as air, space, metal, optical fiber, or some other signal propagation path—including combinations thereof. Communication links 314, 316 may comprise many different signals sharing the same link. Communication links 314, 316 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 302 and access node 304 could share the same representative wireless link 314, 316, but be transferred over different communication sessions, frequencies, timeslots, packets, ports, sockets, logical transport links, or in different directions—including combinations thereof.

Wireless device 302 can establish a communication session with controller node 308 via access node 304 or wireless device 302 can establish a communication session with controller node 310 via access node 306 to communicate information over system 300 using various communication services. These services can include voice and/or data services. For example, mobile voice services, mobile data services, push-to-talk services, internet services, web browsing, email, pictures, picture messaging, video, video messaging, audio, voicemail, music, MP3's, ring tones, stock tickers, new alerts, etc.

Access node 304 can be any network node configured to provide communications to wireless device 302 over the first network operator network 301. Access node 306 can be any network node configured to provide communications to wireless device 302 over the second network operator network 303. For example, access nodes 304, 306 can be selected from a base transceiver station, a radio base station, an eNodeB device, or an enhanced eNodeB device. It is noted that as illustrated in FIG. 3, only one access node 304 is associated with the first network operator network 301 and one access node 306 is associated with the second network operator network 303, any number of access nodes can be implemented within each network operator's network within system 300.

Access nodes 304, 306 can be configured to establish communication sessions with wireless device 302 over a plurality of frequency bands and/or using a plurality of radio access technologies. For example, access nodes 304, 306 can be configured to provide at least one frequency band within a 3G mode and at least one frequency band within a 4G mode. In addition, access nodes 304, 306 can be configured to provide a plurality of frequency bands within each radio access technology. For example, access nodes 304, 306 can be configured to establish communication sessions with wireless devices over a first, second, third etc. frequency band within the 3G and/or 4G modes.

Access nodes 304, 306 can comprise a processor and associated circuitry to execute or direct the execution of computer-readable instructions to obtain information. Access nodes 304, 306 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 304, 306 can receive instructions and other input at a user interface.

Controller node 308 can be any network node configured to communicate information or control information over the first network operator system 301. Controller node 310 can be any network node configured to communicate information or control information over the second network operator system 303. In addition, controller nodes 308, 310 can be configured to communicate with each other and/or configured to determine whether wireless device 302 has authorization to communicate over networks 301, 303. Controller nodes 308, 310 can be a single device having various functions or a plurality of devices have different functions. For example, controller nodes 308, 310 can include at least one of a mobility management entity (MME), a serving gateway (SGW), a public data network gateway (PGW), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller nodes 308, 310 are not limited to any specific technology architecture, such as Long Term Evolution (LTE) and can be used with any network architecture and/or protocol.

Controller nodes 308, 310 can comprise a processor and associated circuitry to execute or direct the execution of computer-readable instructions to obtain information. Controller nodes 308, 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control nodes 308, 310 can receive instructions and other input at a user interface.

Controller node 308 can be in communication with access node 304 over the first network operator system 301 via communication link 318. Controller node 310 can be in communication with access node 306 over the second network operator system 303 via communication link 320. Access node 304 can be in communication with communication network 312 via communication link 322. Access node 306 can be in communication with communication network 312 via communication link 324. Communication links 318, 320, 322, 324 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 318, 320, 322, 324 can be a direct link or might include various equipment, intermediate components, systems, and networks.

Communication network 312 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 312 can be capable of carrying data, for example, to support voice, push-to-talk, and data communications by a wireless device such as wireless device 102. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 312 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 312 can also comprise additional base stations, controller nodes, telephony switches, internet routers, network gateways, computer systems, communication links, or some other type of communication equipment, and combinations thereof.

In operation, wireless device 302 can be configured to communicate over a system associated with a first network operator 301 and a second network operator 303 using various frequency bands associated with one or more radio access technologies where one frequency band is most preferred. For example, wireless device 302 can be associated with a first network operator 301 where the first network operator 301 could be considered a home network operator and the second network operator 303 could be considered a roaming network operator. In addition, wireless device 302 can be configured to communicate using both a first radio access technology and a second radio access technology where one radio access technology is most preferred. For example, wireless device 302 can be configured to communicate in both a 3G mode and a 4G mode, where 4G is the most-preferred mode.

Access nodes 304, 306 can be configured to communicate with wireless device 302 over a plurality of frequency bands, where each frequency band is associated with a radio access technology. Each access node 304, 306 can be configured to communicate over a plurality of frequency bands within the same or different radio access technologies. For example, access node 304 can be configured to communicate with wireless device 302 over one or more frequency bands within the 3G mode and/or one or more frequency bands within the 4G mode.

Controller node 308 and/or controller node 310 can determine a timer having a timer duration for each frequency band associated with each access node 304, 306 based on information provided to controller node 308 and/or controller node 310 from each access node 304, 306. For example, controller node 308 and/or controller node 310 can determine a timer such as a better system reselection (BSR) scanning timer for each frequency band associated with both access nodes 304, 306.

Each timer can be based on at least one criteria associated with each frequency band. For example, the frequency band criteria can be based on at least one of a coverage criteria of the frequency band associated with access nodes 304, 306 capacity of the access nodes corresponding to the frequency band, and/or information indicative of costs associated with establishing a communication session between the wireless device 302 and the access nodes 304 and 306 over the frequency band. The coverage criteria can further include information indicative of a coverage area of each access node 304, 306 within the frequency band, a signal level within the coverage area of the access node within the frequency band, and/or a throughput associated with the frequency band within the coverage area.

The controller nodes 308 and/or 310 can initiate an inquiry to access nodes 304, 306 to request the frequency band criteria. This inquiry can be initiated at predetermined intervals or in response to a predetermined event. Alternatively, the controller nodes 308 and/or 310 can instruct the access nodes 304, 306 to send the frequency band criteria at predetermined intervals or in response to a predetermined event such as when a frequency band criteria exceeds a predetermined threshold or when a wireless device initiates a communication session or discontinues a communication session with either access node 304, 306.

Controller node 308 and/or 310 can determine a timer duration for each timer associated with each frequency band based on the frequency band criteria received from access nodes 304, 306. For example, controller node 308 and/or 310 can receive a first frequency band criteria of a first frequency band from access node 304, a second frequency band criteria of the first frequency band from access node 306, a third frequency band criteria of a second frequency band from access node 304, and a fourth frequency band criteria of the second frequency band from access node 306. Each timer duration can be different from other timer durations. For example, the timer duration of a most preferred frequency band can be less than a timer duration for a lesser preferred frequency band such that when the timer is initiated at the wireless device 302, the wireless device 302 scans for the most-preferred frequency band more often than scanning for a lesser preferred frequency band.

Controller node 308 and/or 310 can transmit each timer duration to the wireless device 302 after the wireless device establishes a communication session with access node 304. For example, when wireless device 302 establishes a communication session with access node 304 using a lesser preferred frequency band, instructions can be sent to wireless device 302 to initiate scanning of more-preferred frequency bands during an idle mode. The instructions to initiate the scanning timers can include instructions that the plurality of timers be initiated substantially simultaneously such that the timer durations can overlap.

When wireless device 302 initiates a timer associated with each frequency band during an idle mode, wireless device 302 can scan for a more-preferred frequency band after the timer duration expires. When wireless device 302 detects a more-preferred frequency band from access node 306 following a scan, wireless device 302 can initiate a communication session with access node 306 via communication link 316 over the more-preferred frequency band and discontinue communications with access node 304 over the less-preferred frequency band.

Controller node 308 and/or 310 can periodically update timer durations associated with each determined timer based on updated frequency band criteria provided by access nodes 304, 306. The controller node 308 and/or 310 can transmit the updated timer durations to the wireless device 302. The updated timer durations can be periodically transmitted to the wireless device 302 while the wireless device 302 is in communication with access node 304 or 306. Alternatively, the updated timer durations can be transmitted to the wireless device 302 after the wireless device is handed over from access node 304 to access node 306 where the timer durations can be transmitted via access node 304 before the wireless device 302 is handed over or via access node 306 after the wireless device 302 is handed over.

Figure 4:
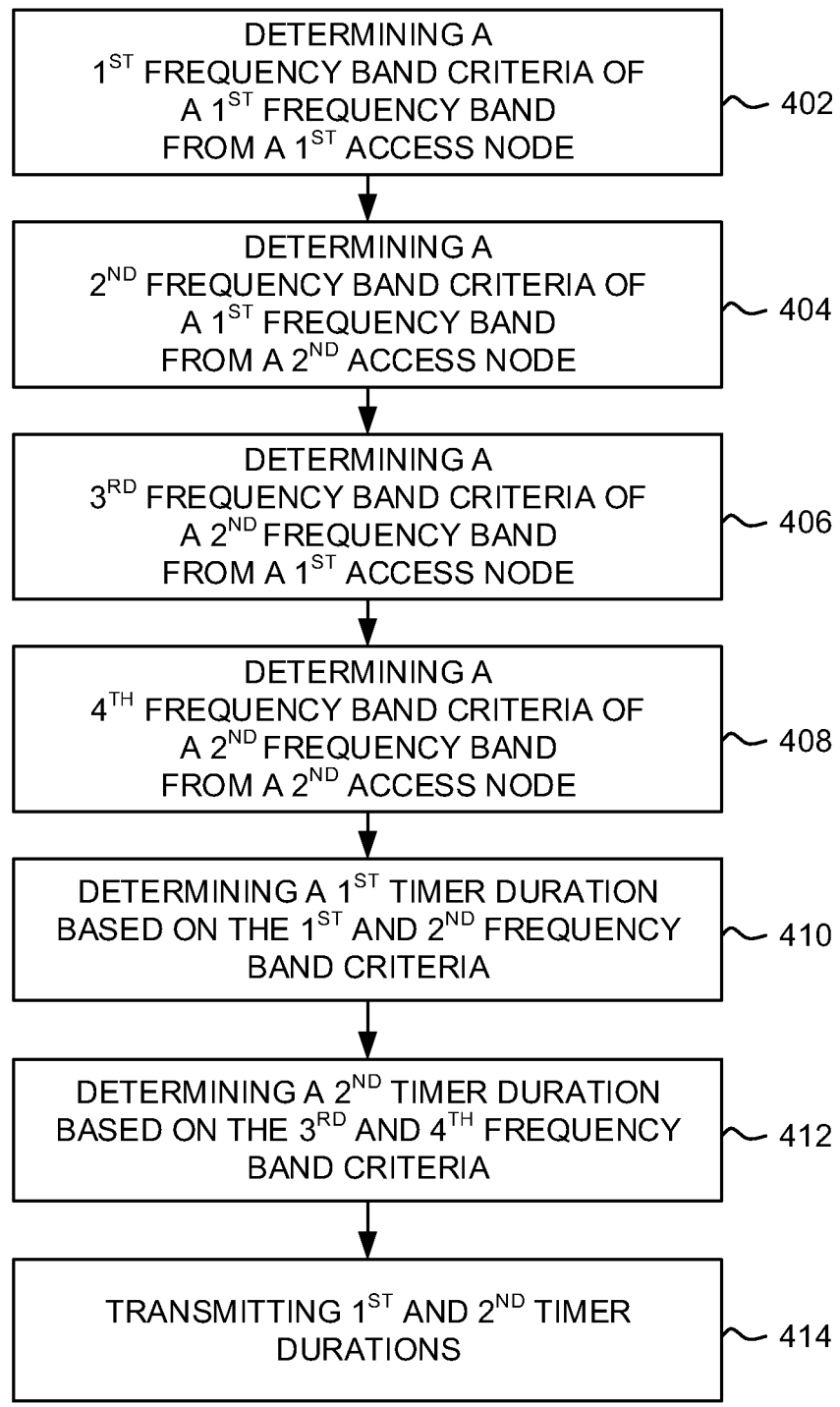
FIG. 4 illustrates an exemplary market area of a wireless device.

FIG. 4 illustrates a flow chart of an exemplary method of communicating with a wireless device in a wireless communication system. The method will be discussed with reference to the exemplary communication system 300 illustrated in FIG. 3. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

A network node can determine a first frequency band criteria of a first frequency band from a first access node at 402. For example, controller node 308 and/or 310 can receive a first frequency band criteria from access node 304. The first frequency band criteria can include one or more of the following factors: a coverage criteria of the first frequency band associated with access node 304, capacity of the access node 304 corresponding to the first frequency band, and/or information indicative of costs associated with establishing a communication session between the wireless device 302 and the access node 304 over the first frequency band. The coverage criteria can further include information indicative of a coverage area of the access node 304 within the first frequency band, a signal level within the coverage area of the access node 304 within the first frequency band, and/or a throughput associated with the first frequency band within the coverage area of access node 304.

A network node can determine a second frequency band criteria of a first frequency band from a second access node at 404. For example, controller node 308 and/or 310 can receive a second frequency band criteria from access node 306. The second frequency band criteria can include one or more of the following factors: a coverage criteria of the first frequency band associated with access node 306, capacity of the access node 306 corresponding to the first frequency band, and/or information indicative of costs associated with establishing a communication session between the wireless device 302 and the access node 306 over the first frequency band. The coverage criteria can further include information indicative of a coverage area of the access node 306 within the first frequency band, a signal level within the coverage area of the access node 306 within the first frequency band, and/or a throughput associated with the first frequency band within the coverage area of access node 306.

A network node can determine a third frequency band criteria of a second frequency band from the first access node at 406. For example, controller node 308 and/or 310 can receive a third frequency band criteria from access node 304. The third frequency band criteria can include one or more of the following factors: a coverage criteria of the second frequency band associated with access node 304, capacity of the access node 304 corresponding to the second frequency band, and/or information indicative of costs associated with establishing a communication session between the wireless device 302 and the access node 304 over the second frequency band. The coverage criteria can further include information indicative of a coverage area of the access node 304 within the second frequency band, a signal level within the coverage area of the access node 304 within the second frequency band, and/or a throughput associated with the second frequency band within the coverage area of access node 304.

A network node can determine a fourth frequency band criteria of a second frequency band from a second access node at 408. For example, controller node 308 and/or 310 can receive a fourth frequency band criteria from access node 306. The fourth frequency band criteria can include one or more of the following factors: a coverage criteria of the second frequency band associated with access node 306, capacity of the access node 306 corresponding to the second frequency band, and/or information indicative of costs associated with establishing a communication session between the wireless device 302 and the access node 306 over the second frequency band. The coverage criteria can further include information indicative of a coverage area of the access node 306 within the second frequency band, a signal level within the coverage area of the access node 306 within the second frequency band, and/or a throughput associated with the second frequency band within the coverage area of access node 306.

At 410, the network node can determine a first timer duration of a first timer based on the first and second frequency band criteria and a second timer duration of a second timer based on the third and fourth frequency band criteria. The timer durations can be associated with more or less preferred frequency bands. For example, a timer duration associated with a more-preferred frequency band can be shorter than a timer duration associated with a lesser-preferred frequency band.

At 414, the network node can transmit the first and second timer durations to a wireless device. For example, controller node 308 and/or 310 can transmit instructions including the first timer duration and the second timer duration to wireless device 302 after wireless device 302 establishes a communication session with access node 304 over a lesser-preferred frequency band. Wireless device 302 can use a first timer having the first timer duration and a second timer having the second timer duration to scan for a more preferred frequency band.

The first timer and the second timer can be initiated at the wireless device 302 during an idle mode and when each timer duration expires, the wireless device can initiate a scan for the corresponding frequency band. For example, wireless device 302 can initiate a scan for the first frequency band after the first timer duration expires and the wireless device 302 can initiate a scan for the second frequency band after the second timer duration expires.

The first and second timer durations can be re-determined and the updated timer durations can be transmitted to wireless device 302. For example, when wireless device 302 is instructed to establish communications with access node 306 and discontinue communications with access node 304, the updated timer durations can be transmitted to wireless device after communication is established with access node 306.

While not illustrated in FIG. 4, one of ordinary skill in the art would recognize that the network node can determine any number of timer durations based on the number of frequency bands associated with access nodes 304, 306. For example, when access node 304 can establish a wireless communication session with wireless device 302 using three different frequency bands where the frequency bands can be associated with the same or different network operators, controller nodes 308 and/or 310 can determine three timer durations where each timer duration is different.

Figure 5:
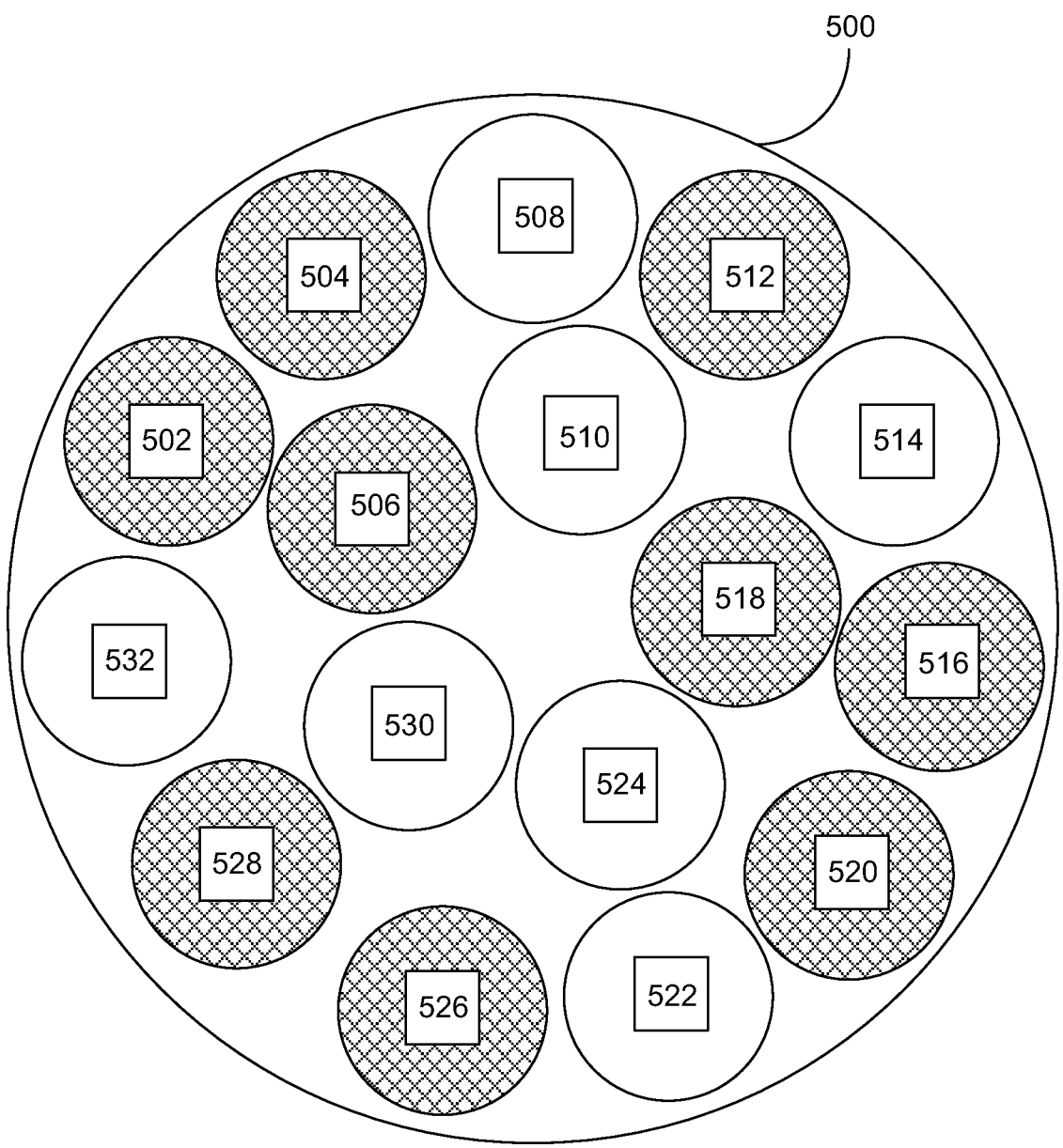
FIG. 5 illustrates exemplary timer durations used in an exemplary communication system.

FIG. 5 illustrates an exemplary market area 500 of a wireless communication system. Market area 500 can be a portion of a geographic area served by a first network operator and a second network operator. Market area 500 can include access nodes associated with a first network operator 502, 504, 506, 512, 516, 518, 520, 526, 528 and access nodes associated with a second network operator 508, 510, 514, 522, 524, 530, 532 (illustrated with shaded coverage areas). Each access node can have a corresponding coverage area (illustrated by the circles surrounding each access node 502, 504, 506, 508, 510, 512, 514, 516, 518, 520, 522, 524, 526, 528, 530, 532) where each access node can be configured to provide one or more frequency bands in one or more radio access technologies within the corresponding coverage area. While omitted for clarity, one of ordinary skill in the art would appreciate that coverage areas of adjacent access nodes can overlap.

In an embodiment, each access node 502, 504, 506, 508, 510, 512, 514, 516, 518, 520, 522, 524, 526, 528, 530, 532 can be configured to communicate with wireless devices over one or more frequency bands of one or more radio access technologies. For example, n 3G frequency bands (3GF1, 3GF2, . . . 3GFn) and/or m 4G frequency bands (4GF1, 4GF2, . . . 4GFm) can be provided within a geographic location such as market 500. One of ordinary skill in the art would appreciate that other types of radio access technologies could be implemented such as Global System for Mobile telecommunications (GSM), Code Division Multiple Access (CDMA), Worldwide Interoperability for Microwave Access (WiMAX), or Long Term Evolution (LTE), or combinations thereof.

One or more wireless devices can be configured to establish communications with an access node 502, 504, 506, 508, 510, 512, 514, 516, 518, 520, 522, 524, 526, 528, 530, 532 over one of the plurality of frequency bands associated with the access nodes. For example, a wireless device can include a plurality of transceivers that can communicate within market 500 using two or more frequency bands, where the preference to establish communications using each of the plurality of frequency bands are ranked based on a predetermined preference. The predetermined preference can relate to a perceived user experience. For example, a wireless device can be configured to communicate using a 3G mode and a 4G mode. While a 4G mode may be more preferred to enhance user experience, 4G coverage availability may be limited due to hardware limitations of the network. For example, a network operator may not have upgraded network infrastructure to provide 4G coverage within a certain geographic area thereby causing a 4G coverage hole that would require a wireless device to communicate using 3G within such coverage hole.

In an exemplary embodiment, a wireless device can transition between a plurality of frequency bands of the same or different radio access technologies based on timers such as (better system reselection) scanning timers. For example, a network node (not shown) can be in communication with all of the access nodes 502, 504, 506, 508, 510, 512, 514, 516, 518, 520, 522, 524, 526, 528, 530, 532. Each access node can transmit at least one frequency band criteria corresponding to each frequency band provided by the access node.

The network node can determine timer durations for each timer associated with each frequency band in the market 500 based on the at least one frequency band criteria. The frequency band criteria can include at least one of coverage, capacity and/or fees associated with a wireless device establishing a communication session with an access node via the selected frequency band.

In an embodiment, each timer can be determined using the following equation:

$$T_i = \alpha * \text{cost} \cdot F_i + (\beta/\text{coverage} \cdot F_i) + (\varphi/\text{capacity} \cdot F_i)$$

$T_i$ can be the timer duration for a specific frequency band. The timer duration can be indicative of how often the wireless device initiates a scan for the specific frequency band. For example, every 2 minutes, every 4 minutes, every 6 minutes, etc. The timer duration can be indicative of a preferred frequency band over which the wireless device establishes communications. For example, the shorter the timer duration the more-preferred the frequency band; the longer the timer duration the less-preferred the frequency band.

Cost·$F_i$ can be indicative of the cost to communicate over the frequency band. For example, when the wireless device is associated with the home network operator, the cost associated with establishing a communication session with an access node and/or frequency band associated with a roaming network operator would be greater than costs associated with establishing a communication session with an access node and/or frequency band associated with the home network operator. The higher the costs associated with establishing communications over the frequency band, the longer the timer duration because higher costs can be indicative of a less preferred frequency band.

Coverage·$F_i$ can be indicative of the coverage of the frequency band within a geographical area. For example, the coverage of the frequency band can refer to a concentration of access nodes capable of communicating using the frequency band within the market 500. The concentration of the access node can be based on various factors. For example, the coverage area of each access node transmitting the frequency band, a signal level within the coverage area of the access node transmitting the frequency band, and/or throughput associated with the frequency band within the coverage area. The coverage area of the frequency band associated with each access node can be indicative of how far away from the access node the frequency band can be detected by the wireless device. The signal level can be indicative of signal power or signal strength of the frequency band within the coverage area of the access node. The throughput associated with the frequency band can be indicative of how reliable data is transmitted between the access node and the wireless device. Various factors can influence throughput such as interference, data rate, modulation and coding schemes, etc. Each access node can transmit one more of the above-identified frequency band criteria to the network node to be used in determining a timer duration for each frequency band. The larger the Coverage·$F_i$ the smaller the timer duration.

Capacity·$F_i$ can be indicative of the resources available within a geographical area. For example, the aggregated capacity of the market 500 can be determined based on the average resources available within the market. In an embodiment, each access node can provide information indicative of the maximum number of wireless devices that can establish communication sessions with each access node at one time as well as the bandwidth available for each wireless device based on the services or applications required by the wireless device. The larger the Capacity·$F_i$, the smaller the timer duration.

Variables $\alpha$, $\beta$, and $\varphi$ can be constant parameters selected to fine tune the scanning timer. Variables $\alpha$, $\beta$, and $\varphi$ can be based on the mechanisms used by the wireless device to monitor timer durations such as hardware timers or software timers. In addition, variables $\alpha$, $\beta$, and $\varphi$ can be selected to determine a timer such that the timer duration can be more accurately implemented at the wireless device. For example, if the timer duration $T_i$ is calculated to be 2.77325 minutes, variables $\alpha$, $\beta$, and $\varphi$ can be selected such that the timer is a whole round number such as 3 minutes.

The network node that determines each timer duration of a timer can further identify smaller groups within market 500 and determine a timer duration for each frequency band within the smaller group. For example, access nodes 502, 504, 506, 508, and 510 can be associated with a first group, access nodes 512, 514, 516, 518, and 520 can be associated with a second group, and access nodes 522, 524, 526, 528, 530, 532 can be associated with a third group.

The network node can determine a timer duration for each frequency band within each group based on the above described methods. When a wireless device first connects to an access node in a group, the network node can send the timer durations associated with that group. When the wireless device is handed over to an access node in a different group, the network node can transmit updated timer durations based on the new group in which the wireless device has established communications.

Figure 6:
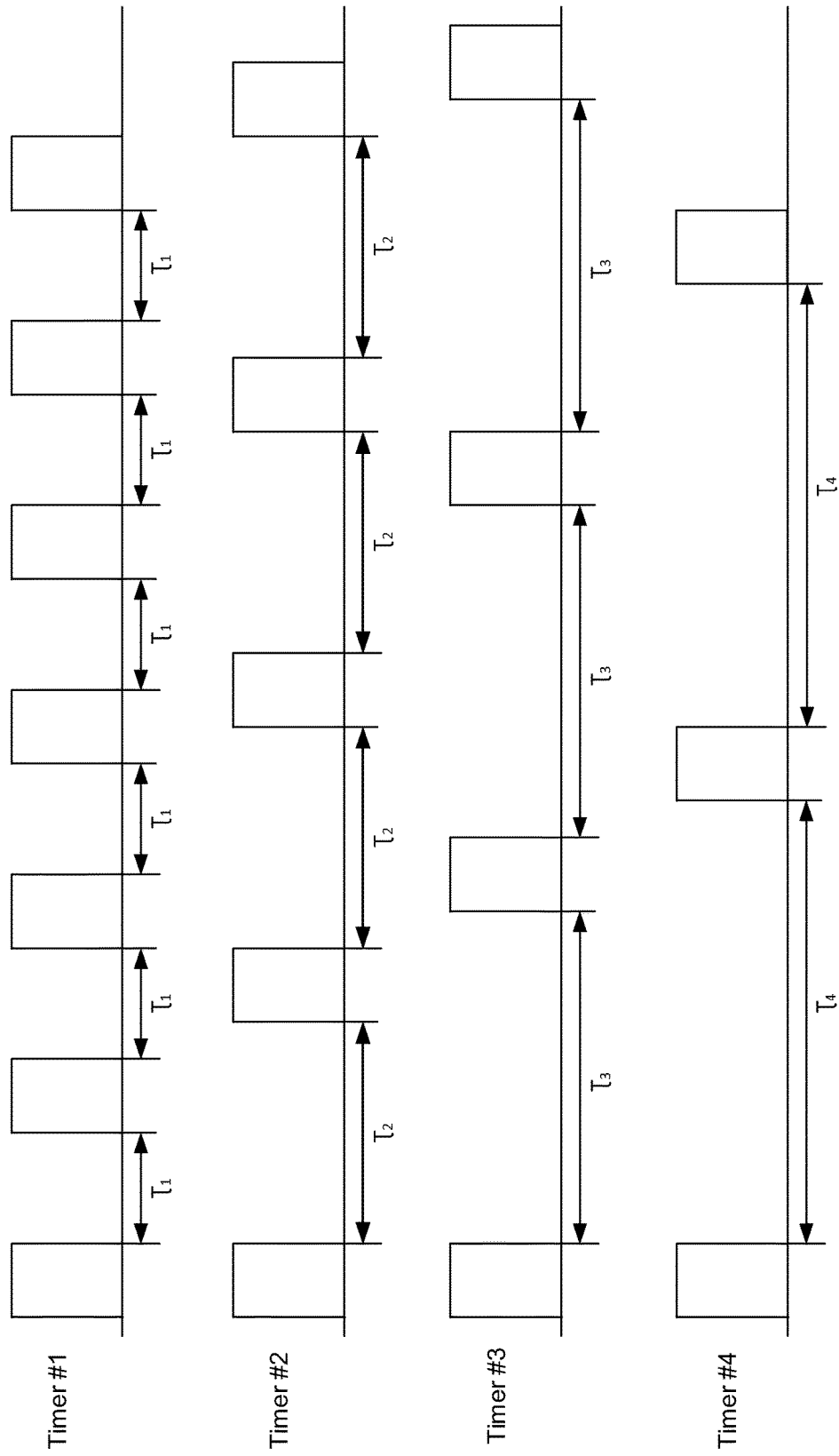
FIG. 6 illustrates another exemplary method of communicating with a wireless device in a communication system.

FIG. 6 illustrates exemplary timer durations used in an exemplary communication system. While four timers (Timer #1, Timer #2, Timer #3, Timer #4) are illustrated, one of ordinary skill in the art would recognize that the number of timers directly correlates to the number of available frequency bands. Therefore, any number of timers having associated timing durations can be determined based on the number of available frequency bands. In addition, for clarity purposes, each timer is illustrated in FIG. 6 as having the same scan duration, however one of ordinary skill in the art would appreciate that the scanning durations can be different based on the priority of the frequency band and/or the timer duration. For example, a scanning duration associated with the most preferred frequency band can be greater than a scanning duration associated with a less preferred frequency band.

Timer #1 having a timer duration of $T_1$ can be associated with the most preferred frequency band and Timer #4 having a timer duration of $T_4$ can be associated with the least preferred frequency band. All timers can be initiated during an idle mode of the wireless device. For example, a wireless device can establish communications with an access node over a less preferred frequency band. During the initial network authorization, a network node can instruct the wireless device to initiate timer #1, timer #2, timer #3, and/or timer #4 during an idle mode in order to scan for a more preferable frequency band. The wireless device can initiate timer #1, timer #2, timer #3, and/or timer #4 at substantially the same time within the same idle mode such that some timer durations can overlap.

Alternatively, the timers can be implemented and initiated based on a ranking of the preferred frequency bands. For example, timer #1 and timer #2 can be initiated first where the wireless device can initiate a scan for a first frequency band after the duration of time #1 expires and a scan for a second frequency band after the duration of timer #2 expires. The wireless device can re-initiate timer #1 and/or timer #2 a predetermined number of times to scan for the first and second frequency bands before further initiating timer #3 to scan for a third frequency band.

In an exemplary embodiment, timer #1 can be determined to be 2 minutes, timer #2 can be determined to be 4 minutes, timer #3 can be determined to be 8 minutes, and timer #4 can be determined to be 16 minutes. When a wireless device is in idle mode and connected to a communication network over a less preferred frequency band, the wireless device can initiate timers 1, 2, 3, and/or 4 to scan for a more preferred frequency band. For example, when a most preferred frequency band is a 4G mode on a home network and wireless device has established communications over a roaming network in a 3G mode, wireless device can initiate timers to search for a more preferred band. The wireless device can initiate timer #1 and every 2 minutes scan for a 4G frequency band from a home network access node. The wireless device can initiate timer #2 and every 4 minutes search for a 3G frequency band from a home network access node. Provided that the wireless device does not find a more preferred frequency band, the wireless device can initiate timer #3 and every 8 minutes search for a 4G frequency band from a roaming access node and timer #4 can be initiated every 16 minutes to search for another 3G frequency band within the roaming network.

Figure 7:
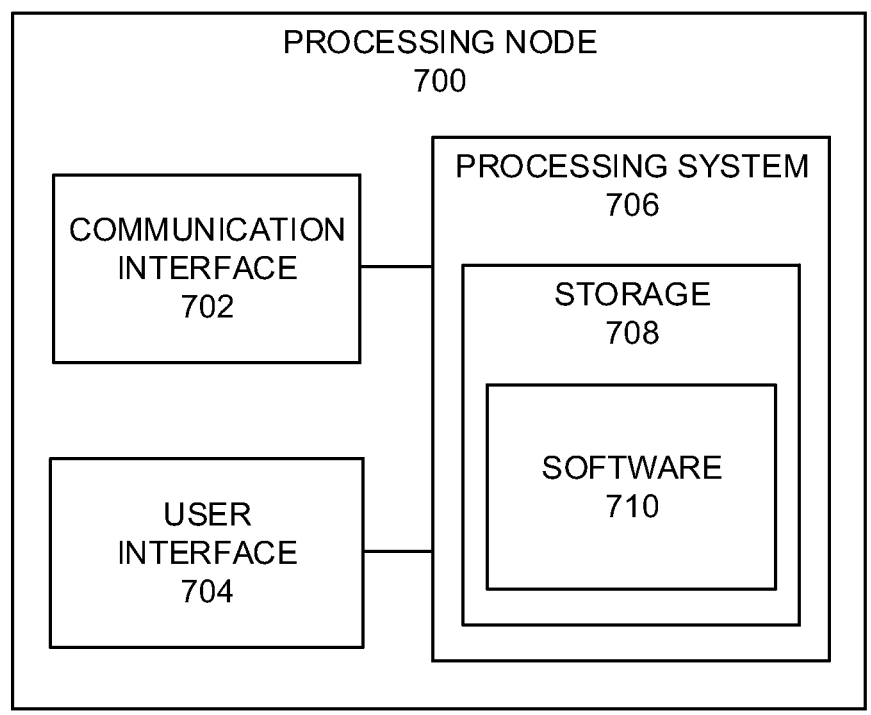
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 is capable of monitoring communications in a communication network. Processing system 706 includes storage 708, which can comprise a disk drive, flash drive, memory circuitry, or other memory device. Storage 708 can store software 710 which is used in the operation of the processing node 700. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access nodes 104, 304, 306, and controller nodes 106, 308, 310. Processing node 700 can also be an adjunct or component of a network element, such as an element of access nodes access nodes 104, 304, 306, and controller nodes 106, 308, 310. Processing node 700 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
   determining at a network node a first frequency band criteria and a second frequency band criteria based on information from an access node, wherein the first frequency band criteria comprises a coverage criteria of a first frequency band associated with the access node, the coverage criteria comprising at least one of a coverage area of the access node within the first frequency band, signal level within the coverage area of the access node within the first frequency band, and throughput associated with the first frequency band within the coverage area, the first frequency band criteria further comprising a capacity of the access node corresponding to the first frequency band, and information indicative of costs associated with establishing a communication session over the first frequency band and the second frequency band criteria comprises a coverage criteria of a second frequency band associated with the access node, the coverage criteria of the second frequency band comprising at least one of information indicative of a coverage area of the access node within the second frequency band, signal level within the coverage area of the access node within the second frequency band, and throughput associated with the second frequency band within the coverage area, the second frequency band criteria further comprising a capacity of the access node corresponding to the second frequency band, and information indicative of costs associated with establishing a communication session over the second frequency band;
   determining at the network node a first timer duration of a first timer, wherein the first timer duration is based on the first frequency band criteria;
   determining at the network node a second timer duration of a second timer, wherein the second timer is based on the second frequency band criteria and the first timer duration is different from the second timer duration; and
   transmitting the first timer duration and the second timer duration from the network node to a wireless device after the wireless device establishes communication with the access node.

2. The method of claim 1, wherein determining the first frequency band criteria and the second frequency band criteria further comprises receiving the first frequency band criteria and the second frequency band criteria from the access node.

3. The method of claim 1, further comprising instructing the wireless device to initiate the first timer and the second timer during an idle mode.

4. The method of claim 3, further comprising
instructing the wireless device to initiate the first timer and the second timer substantially simultaneously during the idle mode.

5. The method of claim 3, further comprising
instructing the wireless device to initiate a scan for the first frequency band after the first timer duration expires; and
instructing the wireless device to initiate a scan for the second frequency band after the second timer duration expires.

6. The method of claim 5, wherein the second timer duration is longer than the first timer duration.

7. The method of claim 1, further comprising determining at the network node a third frequency band criteria;
determining at the network node a third timer duration of a third timer based on the third
frequency band criteria, wherein the third timer duration is different from the first timer duration and the second timer duration; and
transmitting the third timer duration from the network node to the wireless device after the wireless device establishes communication with the access node.

8. The method of claim 7, wherein the third timer duration is longer than the first timer duration and the second timer duration.

9. A method of operating a wireless communication system comprising:
determining at a network node a first frequency band criteria of a first frequency band based on information from a first access node;
determining at the network node a second frequency band criteria of the first frequency band based on information from a second access node;
determining at the network node a third frequency band criteria of a second frequency band based on information from the first access node;
determining at the network node a fourth frequency band criteria of the second frequency band based on information from the second access node;
determining at the network node a first timer duration of a first timer based on the first frequency band criteria and the second frequency band criteria;
determining at the network node a second timer duration of a second timer based on the third frequency band criteria and the fourth frequency band criteria, wherein the first timer duration is different from the second timer duration;
transmitting the first timer duration and the second timer duration from the network node to a wireless device after the wireless device establishes communications with the first access node;
periodically updating the first timer duration and the second timer duration based on an updated first frequency band criteria, an updated second frequency band criteria, an updated third frequency band criteria, and an updated fourth frequency band criteria; and
transmitting an updated first timer duration and an updated second timer duration to the wireless device.

10. The method of claim 9, wherein the first timer duration is shorter than the second timer duration.

11. The method of claim 9, wherein the first frequency band criteria comprises at least one of a coverage criteria of a first frequency band associated with the first access node, capacity of the first access node corresponding to the first frequency band, and information indicative of costs associated with establishing a communication session over the first frequency band at the first access node,
the second frequency band criteria comprises at least one of a coverage criteria of the first frequency band associated with the second access node, capacity of the second access node corresponding to the first frequency band, and information indicative of costs associated with establishing a communication session over the first frequency band at the second access node,
the third frequency band criteria comprises at least one of a coverage criteria of a second frequency band associated with the first access node, capacity of the first access node corresponding to the second frequency band, and information indicative of costs associated with establishing a communication session over the second frequency band at the first access node, and
the fourth frequency band criteria comprises at least one of a coverage criteria of the second frequency band associated with the second access node, capacity of the second access node corresponding to the second frequency band, and information indicative of costs associated with establishing a communication session over the second frequency band at the second access node.

12. The method of claim 9, further comprising
instructing the wireless device to initiate a handover from the first access node to the second access node;
instructing the wireless device to establish communications with the second access node and discontinue communications with the first access node; and
transmitting the updated first timer duration and the updated second timer duration when the wireless device establishes communications with the second access node.

13. The method of claim 9, further comprising
instructing the wireless device to initiate the first timer and the second timer during an idle mode;
instructing the wireless device to initiate a scan for a first frequency band after the first timer duration expires; and
instructing the wireless device to initiate a scan for the second frequency band after the second timer duration expires.

14. A wireless communication system comprising:
a processing node configured to
determine at a network node a first frequency band criteria and a second frequency band criteria based on information from an access node, wherein the first frequency band criteria comprises a coverage criteria of a first frequency band associated with the access node, the coverage criteria comprising at least one of a coverage area of the access node within the first frequency band, signal level within the coverage area of the access node within the first frequency band, and throughput associated with the first frequency band within the coverage area, the first frequency band criteria further comprising capacity of the access node corresponding to the first frequency band, and information indicative of costs associated with establishing a communication session over the first frequency band and the second frequency band criteria comprises a coverage criteria of a second frequency band associated with the access node, the coverage criteria of the second frequency band comprising at least one of information indicative of a coverage area of the access node within the second frequency band, signal level within the coverage area of the access node within the second frequency band, and throughput associated with the second frequency band within the coverage area, the second frequency band criteria further comprising a capacity of the access node corresponding to the second frequency band, and information indicative of costs associated with establishing a communication session over the second frequency band;

determine a first timer duration of a first timer, wherein the first timer duration is based on the first frequency band criteria;

determine a second timer duration of a second timer, wherein the second timer is based on the second frequency band criteria and the first timer duration is different from the second timer duration; and transmit the first timer duration and the second timer duration from the network node to a wireless device after the wireless device establishes communication with the access node.

15. The system of claim 14, wherein the processing node is further configured to instruct the wireless device to initiate the first timer and the second timer during an idle mode.

16. The system of claim 15, wherein the processing node is further configured to instruct the wireless device to initiate a scan for the first frequency band after the first timer duration expires and initiate a scan for the second frequency band after the second timer duration expires.

* * * * *